(12) United States Patent
Bensmann

(10) Patent No.: US 12,269,589 B2
(45) Date of Patent: Apr. 8, 2025

(54) WING FOR AN AIRCRAFT

(71) Applicant: Airbus Operations GmbH, Hamburg (DE)

(72) Inventor: Stefan Bensmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 42 days.

(21) Appl. No.: 18/346,936

(22) Filed: Jul. 5, 2023

(65) Prior Publication Data

US 2024/0010323 A1  Jan. 11, 2024

(30) Foreign Application Priority Data

Jul. 7, 2022 (DE) .......................... 102022116949.9

(51) Int. Cl.
*B64C 3/18* (2006.01)
*B64C 3/34* (2006.01)

(52) U.S. Cl.
CPC ............... *B64C 3/185* (2013.01); *B64C 3/34* (2013.01)

(58) Field of Classification Search
CPC .......... B64C 1/065; B64C 3/18; B64C 3/182; B64C 3/185; B64C 3/187; B64C 3/24; B64C 3/34; B64C 3/36; B64C 13/28; B64C 13/36; B64D 15/02; B64D 15/04; B64D 15/06; B64D 27/30; B64D 27/32; B64D 37/00; B64D 37/005; B64D 37/04
USPC ...................................................... 244/123.8
See application file for complete search history.

(56) References Cited

U.S. PATENT DOCUMENTS

| 3,447,768 | A | * | 6/1969 | McQueen | B64D 37/04 244/135 R |
| 6,868,314 | B1 | * | 3/2005 | Frink | B64U 20/70 244/119 |
| 7,391,622 | B2 | * | 6/2008 | Marshall | B64C 27/473 361/795 |
| 10,368,401 | B2 | * | 7/2019 | Wen | B64D 45/00 |
| 10,661,731 | B2 | * | 5/2020 | Takata | H01B 7/04 |
| 10,906,628 | B2 | * | 2/2021 | Arana Hidalgo | B64C 5/06 |
| 2005/0034781 | A1 | * | 2/2005 | Rodousakis | B64D 37/06 141/383 |

(Continued)

FOREIGN PATENT DOCUMENTS

| CN | 103842704 | 6/2014 |
| EP | 2698316 A2 | 2/2014 |

(Continued)

OTHER PUBLICATIONS

German Search Report for Application No. 102022116949 dated May 24, 2023.

(Continued)

*Primary Examiner* — Joshua E Rodden
(74) *Attorney, Agent, or Firm* — KDW Firm PLLC

(57) ABSTRACT

A wing for an aircraft includes a leading edge as a first chordwise edge, a trailing edge as a second chordwise edge, an upper skin extending between the leading edge and the trailing edge, a lower skin extending between the leading edge and the trailing edge, at least one spar extending between the upper skin and the lower skin in a spanwise direction to create wing box with the upper skin and the lower skin, and at least one of a fluid line, an electrical line, and a mechanical power transfer device attached inside or reaching into the wing box at least partially.

10 Claims, 2 Drawing Sheets

(56) References Cited

U.S. PATENT DOCUMENTS

| | | | |
|---|---|---|---|
| 2007/0018049 A1* | 1/2007 | Stuhr | B64C 23/069 244/124 |
| 2009/0218450 A1* | 9/2009 | McAlinden | B64C 9/02 244/90 R |
| 2012/0024418 A1* | 2/2012 | French | B64D 37/005 141/234 |
| 2012/0037755 A1* | 2/2012 | Tucker | B64C 3/18 244/123.1 |
| 2012/0103685 A1 | 5/2012 | Blanchard | |
| 2013/0081734 A1 | 4/2013 | Waugh | |
| 2016/0129985 A1* | 5/2016 | Mohanty | B64C 3/182 244/119 |
| 2016/0343467 A1* | 11/2016 | Wen | H01B 7/0823 |
| 2017/0291682 A1 | 10/2017 | Sullivan | |
| 2018/0118324 A1 | 5/2018 | Tyler | |
| 2019/0112027 A1* | 4/2019 | Ahern | B64C 9/02 |
| 2020/0017190 A1 | 1/2020 | Decker | |
| 2020/0055611 A1 | 2/2020 | Walters | |
| 2020/0156802 A1* | 5/2020 | Honnamaranahalli | F16L 39/04 |
| 2020/0317363 A1* | 10/2020 | Hurley | F16L 3/015 |
| 2021/0179255 A1 | 6/2021 | Balsa-Gonzalez | |
| 2022/0274684 A1* | 9/2022 | Tulloch | B64D 37/30 |
| 2022/0297850 A1* | 9/2022 | Gilbertson | H02G 3/0406 |

FOREIGN PATENT DOCUMENTS

| | | | |
|---|---|---|---|
| EP | 3611097 A1 | 2/2020 | |
| EP | 3656674 A1 | 5/2020 | |
| WO | 2018158766 A1 | 9/2018 | |
| WO | WO-2020077121 A1 * | 4/2020 | B64C 3/185 |
| WO | 2021122542 A1 | 6/2021 | |

OTHER PUBLICATIONS

Extended European Search Report for Application No. 23179919 dated Oct. 30, 2023.

* cited by examiner

WING FOR AN AIRCRAFT

TECHNICAL FIELD

The disclosure herein relates to a wing for an aircraft and an aircraft having such a wing.

BACKGROUND

Commercial or transport aircraft having fixed wings are usually equipped with a plurality of system components, such as electrical lines, hydraulic tubes, hot air ducts, mechanical shafts, and the like, which may be placed in a leading-edge region and/or a trailing edge region. They are used for various purposes such as providing power for high-lift devices, anti- or de-icing, lighting, and other applications.

These system components are commonly arranged forward of a front spar or rearward of a rear spar, which are usually fluid-tight as they function as a forward or rearward delimitation for a fuel tank arranged inside a so-called wing box. Thus, the front spar and rear spar are usually designed in a fluid-tight manner and represent installation boundaries for high lift control systems. Separation and segregation of different system components inside the wing requires a significant effort.

U.S. Pat. No. 11,242,129 B2 shows a structural assembly for an airfoil structure comprising at least one connection member configured to connect a leading-edge member, or a trailing-edge member, of an airfoil structure to a torsion-box member, such that the connection member prevents the leading-edge member, or trailing-edge member, from pivoting relative to the torsion-box member away from an operational position. At least one corresponding support is provided wherein the support is configured to be attachable to the connection member and further configured to be attachable to at least one system element, such as a bleed air duct.

SUMMARY

In future aircraft, other concepts for storing fuel or other energy carriers may be considered. Thus, it is an object of the subject matter herein to disclose an alternative wing design that is improved regarding the support of lines and mechanical power transfer devices.

This object is met by a wing having features disclosed herein. Advantageous embodiments and further improvements may be gathered from the following description.

A wing for an aircraft is proposed, comprising a leading edge as a first chordwise edge, a trailing edge as a second chordwise edge, an upper skin extending between the leading edge and the trailing edge, a lower skin extending between the leading edge and the trailing edge, at least one spar extending between the upper skin and the lower skin in a spanwise direction to create wing box with the upper skin and the lower skin, and at least one of a fluid line, an electrical line, and a mechanical power transfer device attached inside or reaching into the wing box at least partially.

The leading edge is a forwardmost part of the wing, which faces into the flight direction, i.e. into the airflow. It is usually not far from a stagnation line that separates an upper and a lower part of the wing and that may be found close to the region where the wing has its maximum curvature. The trailing edge represents a rearmost edge. The upper skin and the lower skin are curved to provide the desired aerodynamic characteristics, which may depend on the desired velocity and altitude range of the aircraft, to which the wing is attached.

At the leading edge, and/or at the trailing edge, one or more high lift control surfaces may be provided. For example, a leading edge control surface may be created as a movable nose section in the form of a slat, a droop nose, or a similar device. By extending the leading-edge control surface from a fixed wing part, the camber of the leading-edge region is increased. In some embodiments, also a gap between the leading-edge control surface and the fixed wing part is created. Each leading-edge control surface may be connected to a pair of actuation elements that are driven to move relative to the fixed wing part. In analogy, trailing edge control surfaces may be created by providing separate control surfaces that are extendable from the main wing part or by designing a trailing edge section of the wing to be movable relative to the fixed wing part. The high lift control surfaces usually require mechanical power, which is transferred from a drive unit, an actuator, or a similar device to the respective high lift control surface through a mechanical power transfer device, which—besides linkages and tracks—may also include rotating shafts or hydraulic pipes.

Furthermore, anti- and/or de-icing devices may be arranged at the leading edge. Heating power may be provided electrically or pneumatically and thus requires either an electrical line or a hot air duct.

For providing a sufficient structural stability, the wing, i.e. the main or fixed wing part, comprises at least one spar that extends along the spanwise direction. This may include a front spar and/or a rear spar. It is advantageous to use at least one front spar and at least one rear spar to create a box-like structure with the upper skin and the lower skin, which box-like structure is referred to as wing box.

Future aircraft may not require the wing box to be completely filled with kerosene, but instead use other smaller, separate tanks or other kinds of energy carriers, such as pressure tanks or cryogenic tanks for storing hydrogen, electrical energy storage devices or other. This allows to design the front and/or the rear spar differently. In particular, the respective spar does not need to be fluid-tight and does not represent a delimitation for an interior fuel tank.

The above-identified object is solved by providing the at least one of a fluid line, an electrical line and the mechanical power transfer device attached inside or reaching into the wing box at least partially. The wing box that is not completely filled with fuel provides the opportunity for routing at least some system components safely inside the wing box. Segregation can be done through the at least one spar and no additional protection or separation devices are required.

In other words, the wing according to the disclosure herein allows to place system components also into a region, which is commonly used for storing kerosene, wherein a dedicated sealing or an elaborate design of sealed pockets in the respective spar or a tank delimited by the respective spar is not required. Since the fluid-tightness is not necessary and since the position of the respective spar is not a dimensioning factor of a fuel tank, the respective spar may even be placed more forward or more rearward in comparison with common wing designs, upon desire and depending mainly on the structural stability of the wing. The mechanical design of a wing or a wing box may thus be driven mainly by the aerodynamics and the structural stability.

Since the respective spar is only used for providing the mechanical stability, the at least one of a fluid line, an electrical line, and a mechanical power transfer device may be directly attached to the respective spar, either to a leading-edge facing side facing or to a trailing-edge facing side.

In an advantageous embodiment, the at least one spar comprises a front spar and a rear spar. Preferably, the front spar and the rear spar are arranged to follow constant chordwise points along the spanwise dimension. In other words, they may both be placed at a certain relative position of local chords throughout a major spanwise part of the wing. It is not ruled out that the wing according to the disclosure herein also has a main spar that is arranged between the front spar and the rear spar.

In an advantageous embodiment, several of a fluid line, an electrical line, and a mechanical power transfer device are arranged inside the wing, wherein at least two of a fluid line, an electrical line, and a mechanical power transfer device are separated through the at least one spar. Thus, two lines or other components are separated through the spar without any further, dedicated devices for achieving such a separation or segregation. For example, two hydraulic tubes associated with different hydraulic systems or different hydraulic branches may be placed on different sides of the respective spar. The same applies to electrical lines, which can be arranged on two different sides of the respective spar. This also includes placement of the at least two lines on the same chordwise side of the respective flange, but on opposed edges, e.g. along the vertical z-axis. However, this may also be used in combination, i.e. placing the at least two lines on different chordwise sides of the flange and at the same time on different vertical sides. Thus, a plurality of different separation and segregation options are possible.

In an advantageous embodiment, the at least two of a fluid line, an electrical line, and a mechanical power transfer device are arranged on different sides of the respective spar in a chordwise direction. This means, that a part of the at least two lines is placed in front of the respective spar and the other part is arranged behind the respective spar. The spar may comprise one or a plurality of holders on each chordwise side, which are adapted to hold the respective lines in a distance to the spar. Consequently, the at least two lines comprise a predetermined distance to each other as well as a barrier in form of the respective spar between them.

In an advantageous embodiment, two of a fluid line, an electrical line, and a mechanical power transfer device of the same type are arranged on different sides of the respective spar in chordwise direction. Thus, a mechanical barrier in form of the respective spar is arranged between the two lines, which is advantageous for hydraulic and electrical lines. Hydraulic lines will have a barrier between them to avoid any transfer of mechanical defects from one of the hydraulic lines to another one. The segregation of electrical lines through a metallic barrier in form of the respective spar leads to a further shielding effect.

In an advantageous embodiment, the at least two of a fluid line, an electrical line, and a mechanical power transfer device are arranged on different sides of the respective spar in a vertical direction. If a sufficient separation or segregation can be achieved by merely providing a distance to the respective lines, without necessarily providing a barrier wall in form of a spar or another element between them, it may be sufficient to arrange the lines on vertically opposite sides of the respective spar on the same chordwise side.

In an advantageous embodiment, the at least one spar comprises at least one holder on at least one side for holding the at least one of a fluid line, an electrical line, and a mechanical power transfer device. The at least one holder may comprise a plurality of holders. The at least one holder may be placed on at least one of the chordwise sides of the respective spar. A plurality of holders may be distributed along one or both chordwise sides along the spanwise extension of the wing.

In an advantageous embodiment, the wing comprises at least one hot air or bleed air tube in a distance to the front spar and in a distance to the leading edge. The air tube may be held by a holder attached to a front side of the front spar. For avoiding thermal impact, other lines, such as electric lines, hydraulic tubes or mechanical power transfer devices can be placed in a distance to the air tube, in particular on the rear side of the front spar.

In an advantageous embodiment, a plurality of separate tanks are arranged in the wing box, wherein the tanks are consecutively distributed along the spanwise direction and in a distance to the at least one spar. The tanks may be pressureless tanks, pressure tanks, or cryogenic tanks. In an alternative embodiment or additional thereto, also electrical storage units inside the wing box are conceivable. Segregation of tanks may be provided through ribs. Preferably, the tanks are arranged at a distance to each other. By letting the separate tanks be arranged in a distance to the respective spar, e.g. the front spar, a sufficient installation space is provided for arranging the at least one of a fluid line, an electrical line, and a mechanical power transfer device.

In an advantageous embodiment, at least a part of the at least one spar has a framework structure. Thus, the respective spar does not necessarily comprise a closed surface, but is created by a planar structure consisting of a plurality of interconnected elongate or flat elements. This reduces the weight of the respective spar. Since a framework has a plurality of openings, the design of the respective frame and potentially required openings for the at least one of a fluid line, an electrical line, and a mechanical power transfer device, e.g. for reaching from one side of the respective spar to the other side through a framework opening, can be harmonized.

Furthermore, the disclosure herein further relates to an aircraft comprising at least one wing according to the above.

BRIEF DESCRIPTION OF THE DRAWINGS

In the following, the attached drawings are used to illustrate example embodiments in more detail. The illustrations are schematic and not to scale. Identical reference numerals refer to identical or similar elements. They show.

DETAILED DESCRIPTION

Figure 1:
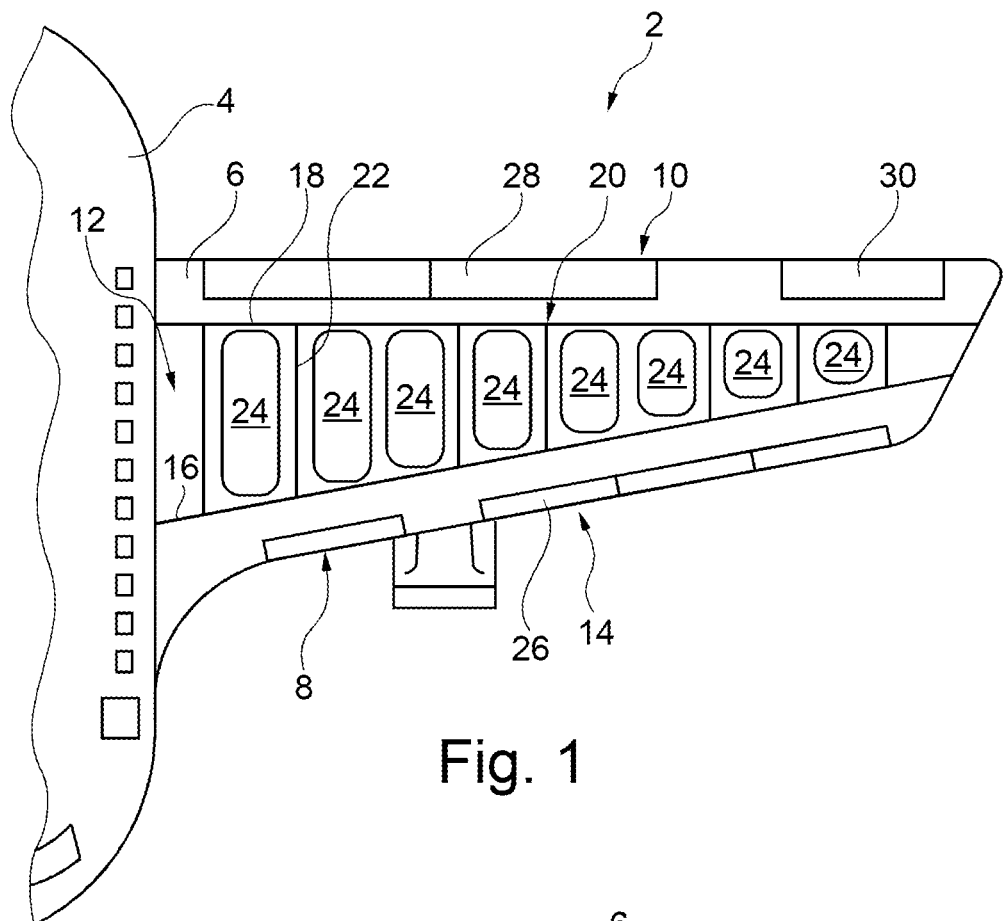
FIG. 1 schematically shows a part of an aircraft in a top view with a partial section.

FIG. 1 shows a part of an aircraft 2 having a fuselage 4 and a wing 6. The wing 6 comprises a leading edge 8 as a first chordwise edge, the trailing edge 10 as a second chordwise edge, an upper skin 12 extending between the leading edge 8 and the trailing edge 10 and a lower skin 14, which is obstructed in this view and which also extends between the leading-edge 8 and the trailing edge 10. A front spar 16 runs along the leading-edge 8, extends substantially in spanwise direction and is preferably parallel to the z-axis, which is the vertical axis in an aircraft-fixed coordinate system. A rear spar 18 is provided, which extends substantially parallel to the trailing edge 10. It is to be understood, that the front spar 16 and the rear spar 18 are completely enclosed by the upper skin 12 and the lower skin 14. The upper skin 12, the lower skin 14, the front spar 16 and the rear spar 18 create a wing box 20.

On the inner surfaces of the upper skin 12 and the lower skin 14 a plurality of chordwise stiffening elements, such as stringers or the like, may be arranged. Together with a plurality of parallelly arranged ribs 22 that extend between the front spar 16 and the rear spar 18 in chordwise directions, the wing box 20 constitutes a rigid, load-carrying structure. Exemplary, several pressure tanks 24 are arranged inside the wing box 20 and are distanced to each other in the span wise direction. Different than in common commercial or transport aircraft neither the front spar 16 nor the rear spar 18 needs to be fluid-tight since the wing box 20 itself is not used as a fuel tank. It is to be understood, that instead of several pressure tanks 24, other separate tanks may be provided or even electrical storage devices or any other energy carrier storing devices.

The wing 6 furthermore comprises leading-edge high-lift devices 26, which are exemplarily realized in the form of slats. At the trailing edge 10, trailing-edge high-lift devices 28 in the form of slats are provided. In addition, an aileron 30 is shown.

Figure 2:
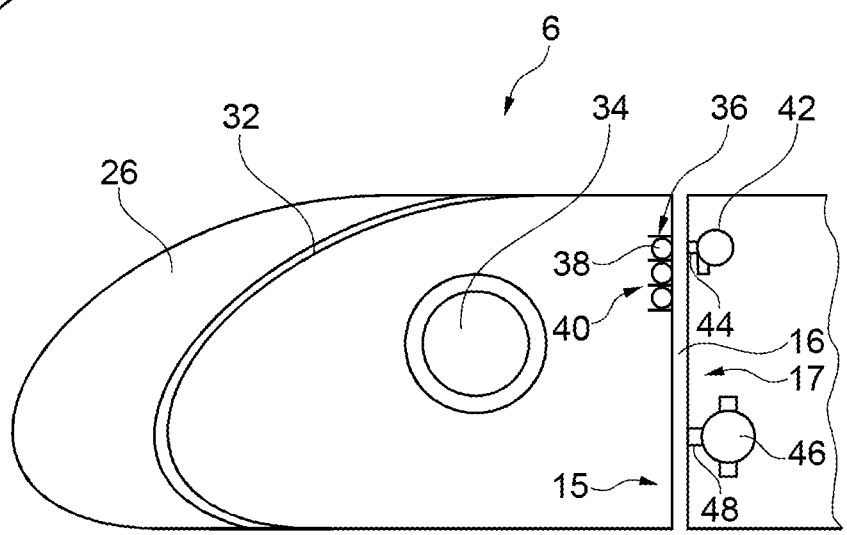
FIG. 2 through 5 schematically show sectional views of a leading-edge region of a wing.

In FIG. 2, a cross-sectional view of a part of the wing 6 is shown. Here, the leading edge high-lift device 26 is arranged in the retracted position and rests on a so-called D-nose section 32. Inside the D-nose section 32, a bleed air tube 34 is provided in a distance to the front spar 16.

Furthermore, the front spar 16 comprises a plurality of first holders 36 holding electrical lines 38 on a front side 15 of the front spar 16. Here, the first holders 36 are arranged directly next to each other along the vertical z axis. The electrical lines 38 in turn extend along the front spar 16, i.e. in a spanwise direction. The first holders 36 may comprise webs 40 to maintain directly adjacent positions of the electrical lines 38.

On a rear side 17 of the front spar 16, exemplarily a hydraulic tube 42 is provided, which is held on the rear side of the front spar 16 held by a second holder 44. At a vertical distance thereto, a mechanical shaft 46 as a mechanical power transfer device is supported on third holders 48.

By providing these components 34, 38, 42 and 46 at distances to each other as well as on two chordwise sides 15, 17 of the front spar 16, an improved separation is achieved without requiring any additional components for this task. Since the front spar 16 does not need to be a fluid-tight component, which defines a forward delimitation of a wing box fuel tank, the front spar 16 could be placed further forward for optimizing the mechanical design of the wing 6 independently from other constraints.

Figure 3:
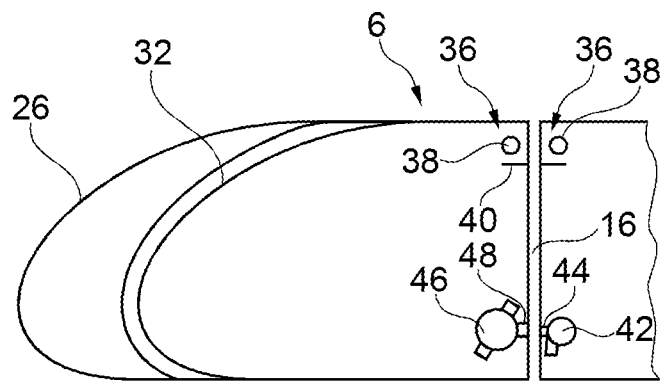

FIG. 3 shows a further setup without the bleed air duct 34. In this example, the mechanical shaft 46 is arranged on a bottom of the front side 15 of the front spar 16. Two electrical lines 38 are separated through the front spar 16 by placing them on both the front side 15 and the rear side 17 of the front spar 16. Thus, a barrier between the electrical lines 38 is created, which improves separation and shielding effects. The hydraulic tube 42 in this example is placed at the bottom of the rear side 17 of the front spar 16. It is thus shielded from the mechanical shaft 46 and vertically separated from both electrical lines 38.

Figure 4:
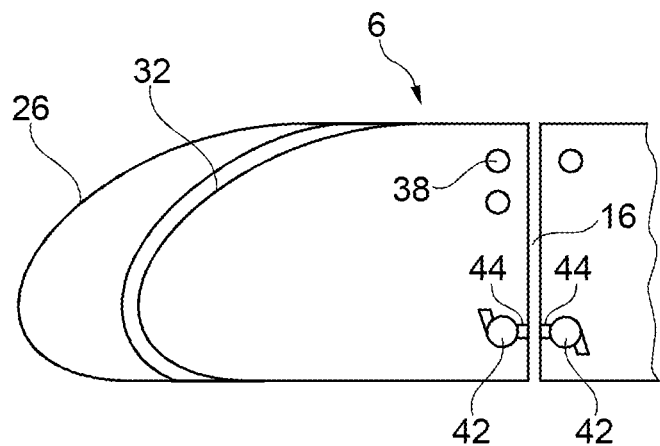

FIG. 4 shows another example, in which a plurality of electrical lines 38 is placed on the front side 15 and the rear side 17 of the front spar 16 in a top region. At the bottom of the front side 15, a first hydraulic tube 42 is placed. At the bottom of the rear side 17, a second hydraulic tube 42 is arranged. Both hydraulic tubes 42 are separated from each other through the mechanical barrier in form of the front spar 16.

Figure 5:
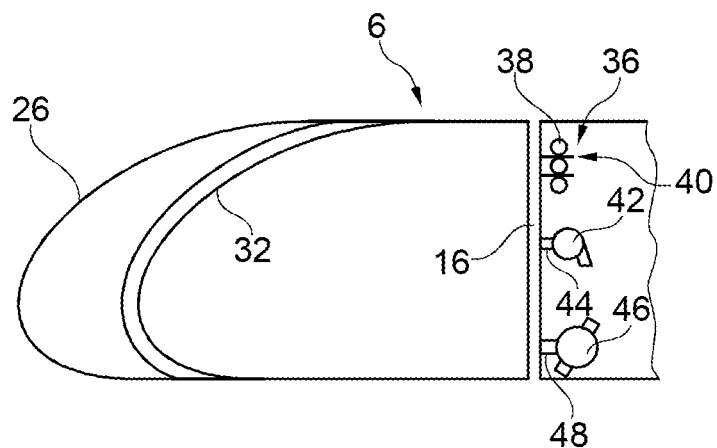

FIG. 5 shows a further example of the wing 6 with the three electrical lines 38 of FIG. 2 placed on the rear side 17 of the front spar 16, together with the hydraulic tube 42 and the mechanical shaft 46. The group of electrical lines 38, the hydraulic tube 42 and the mechanical shaft 46 are evenly distributed over the vertical extension of the front spar 16. Thus, they are clearly separated through their vertical distances from each other.

Figure 6:
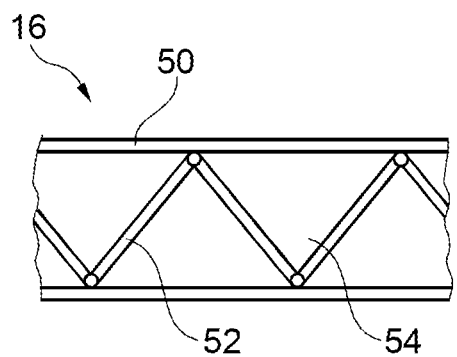
FIG. 6 schematically shows a front spar having a framework structure.

Lastly, FIG. 6 shows the front spar 16 in a front view. It is apparent that the front spar 16 exemplarily comprises a lightweight framework structure with longitudinal beams 50 and crossbeams 52, that are interconnected. Between the beams 50 and the crossbeams 52, a plurality of openings 54 are provided. These allow to pass through at least one of a fluid line 34, 42, an electrical line 38, and a mechanical power transfer device 46 if required.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 2 aircraft
4 fuselage
6 wing
8 leading edge
10 trailing edge
12 upper skin
14 lower skin
15 front side
16 front spar
17 rear side
18 rear spar
20 wing box
22 rib
24 pressure tank
26 leading-edge high-lift device/slat
28 trailing-edge high-lift device
30 aileron
32 D-nose section
34 bleed air tube
36 first holder
38 electrical line
40 web
42 hydraulic tube
44 second holder
46 mechanical shaft 48 third holder
50 longitudinal beam
52 crossbeam
54 opening

The invention claimed is:

1. A wing for an aircraft, comprising:
a leading edge as a first chordwise edge;
a trailing edge as a second chordwise edge;
an upper skin extending between the leading edge and the trailing edge;
a lower skin extending between the leading edge and the trailing edge;
at least one spar extending between the upper skin and the lower skin in a spanwise direction to create a wing box with the upper skin and the lower skin; and
at least two of a fluid line, an electrical line, and a mechanical power transfer device that are inside the wing;
wherein the at least two of the fluid line, the electrical line, and the mechanical power transfer device are separated through the at least one spar.

2. The wing of claim 1, wherein the at least one spar comprises a front spar and a rear spar.

3. The wing of claim 1, wherein the at least two of the fluid line, the electrical line, and the mechanical power transfer device are arranged on different sides of a respective spar of the at least one spar in a chordwise direction.

4. The wing of claim 3, wherein two of the fluid line, the electrical line, and the mechanical power transfer device of a same type are arranged on different sides of the respective spar in the chordwise direction.

5. The wing of claim 1, wherein the at least two of the fluid line, the electrical line, and the mechanical power transfer device are arranged on different sides of a respective spar of the at least one spar in a vertical direction.

6. The wing of claim 1, wherein the at least one spar comprises at least one holder on at least one side for holding the at least two of the fluid line, the electrical line, and the mechanical power transfer device.

7. The wing of claim 2, comprising at least one hot air tube or at least one bleed air tube a distance to the front spar and a distance to the leading edge.

8. The wing of claim 1, comprising a plurality of separate tanks that are arranged in the wing box, and
wherein the tanks are consecutively distributed along the spanwise direction and a distance to the at least one spar.

9. The wing of claim 1, wherein at least a part of the at least one spar has a framework structure.

10. An aircraft comprising at least one wing according to claim 1.

* * * * *